US010040085B2

(12) United States Patent
Burns

(10) Patent No.: US 10,040,085 B2
(45) Date of Patent: Aug. 7, 2018

(54) LIQUID SUPPLY CONTAINER FOR A SPRAY COATING DEVICE

(75) Inventor: Marvin Dean Burns, Millbury, OH (US)

(73) Assignee: CARLISLE FLUID TECHNOLOGIES, INC., Scottsdale, AZ (US)

( * ) Notice: Subject to any disclaimer, the term of this patent is extended or adjusted under 35 U.S.C. 154(b) by 0 days.

(21) Appl. No.: 13/809,465

(22) PCT Filed: Jul. 11, 2011

(86) PCT No.: PCT/US2011/043588

§ 371 (c)(1),
(2), (4) Date: Apr. 1, 2013

(87) PCT Pub. No.: WO2012/009284

PCT Pub. Date: Jan. 19, 2012

(65) Prior Publication Data

US 2013/0186981 A1 Jul. 25, 2013

Related U.S. Application Data

(63) Continuation of application No. 13/050,928, filed on Mar. 17, 2011.

(Continued)

(51) Int. Cl.

*A01G 25/14* (2006.01)
*B05B 11/00* (2006.01)

(Continued)

(52) U.S. Cl.

CPC ........ *B05B 11/0054* (2013.01); *B05B 7/2408* (2013.01); *B05B 7/2478* (2013.01); *B05B 7/0815* (2013.01)

(58) Field of Classification Search

CPC .. B05B 7/2408; B05B 7/2478; B05B 11/0054

(Continued)

(56) References Cited

U.S. PATENT DOCUMENTS 2,887,274 A * 5/1959 Swenson ............... B05B 7/2478 239/371
3,236,459 A * 2/1966 McRitchie ............ B05B 7/2413 239/318

(Continued)

FOREIGN PATENT DOCUMENTS

CN 1705519 12/2005
DE 20023419 U1 4/2004

(Continued)

OTHER PUBLICATIONS

Corresponding Australian Application No. 2011279387 Examination Report dated Jun. 27, 2013.

(Continued)

*Primary Examiner* — Jason Boeckmann
*Assistant Examiner* — Joel Zhou
(74) *Attorney, Agent, or Firm* — Fletcher Yoder, P.C.

(57) ABSTRACT

A system includes a gravity-feed spray coating device having a body with a liquid inlet, a handle coupled to the body, a spray head coupled to the body, a liquid passage extending from the liquid inlet to the spray head, and a gravity-feed container fastener disposed adjacent the liquid inlet. The gravity-feed container fastener includes a non-compression container fastening mechanism. The system also includes a first gravity-feed liquid supply container having a liquid outlet and a compression fitting adapter, wherein the compression fitting adapter compression fits the liquid outlet to the liquid inlet without the non-compression container fastening mechanism.

34 Claims, 3 Drawing Sheets

Related U.S. Application Data

(60) Provisional application No. 61/363,637, filed on Jul. 12, 2010.

(51) Int. Cl.
*B05B 7/24* (2006.01)
*B05B 7/08* (2006.01)

(58) Field of Classification Search
USPC .................. 239/345, 346, 376, 379; 285/921
See application file for complete search history.

(56) References Cited

U.S. PATENT DOCUMENTS

| | | | | |
|---|---|---|---|---|
| 4,266,813 | A * | 5/1981 | Oliver | F16L 25/14 285/12 |
| 5,979,797 | A * | 11/1999 | Castellano | B05B 12/008 239/346 |
| 6,450,542 | B1 | 9/2002 | McCue | |
| 6,595,441 | B2 * | 7/2003 | Petrie | B05B 7/2408 239/345 |
| 6,698,670 | B1 * | 3/2004 | Gosis | B05B 7/2408 222/146.5 |
| 6,712,292 | B1 | 3/2004 | Gosis et al. | |
| 6,820,824 | B1 | 11/2004 | Joseph et al. | |
| 6,877,677 | B2 | 4/2005 | Schmon et al. | |
| 6,945,429 | B2 | 9/2005 | Gosis et al. | |
| 7,086,549 | B2 | 8/2006 | Kosmyna et al. | |
| 7,350,418 | B2 | 4/2008 | Kosmyna et al. | |
| 7,353,964 | B2 | 4/2008 | Kosmyna | |
| 7,354,074 | B2 | 4/2008 | Kosmyna et al. | |
| 7,374,111 | B2 | 5/2008 | Joseph et al. | |
| 7,757,972 | B2 | 7/2010 | Kosmyna et al. | |
| 7,766,520 | B2 | 8/2010 | Kosmyna et al. | |
| 7,798,426 | B2 | 9/2010 | Joseph et al. | |
| 7,798,427 | B2 | 9/2010 | Joseph et al. | |
| 2004/0046051 | A1 * | 3/2004 | Santa Cruz | B01F 13/1055 239/303 |
| 2004/0140373 | A1 * | 7/2004 | Joseph | B05B 7/2408 239/379 |
| 2004/0195245 | A1 | 10/2004 | Gohil | |
| 2004/0217201 | A1 * | 11/2004 | Ruda | B05B 7/2408 239/376 |
| 2004/0217202 | A1 | 11/2004 | Hynes | |
| 2005/0067502 | A1 | 3/2005 | Bouie et al. | |
| 2005/0092770 | A1 * | 5/2005 | Yechouron | B05B 7/2408 222/105 |
| 2006/0151630 | A1 | 7/2006 | Joseph et al. | |
| 2006/0157589 | A1 | 7/2006 | Joseph et al. | |
| 2007/0018016 | A1 * | 1/2007 | Yechouron | 239/376 |
| 2007/0108313 | A1 * | 5/2007 | Bouic | B05B 7/2408 239/345 |
| 2007/0264075 | A1 * | 11/2007 | Panasci | A46B 5/002 401/289 |
| 2008/0011879 | A1 | 1/2008 | Gerson et al. | |
| 2008/0054087 | A1 * | 3/2008 | Joseph | B05B 7/2408 239/11 |
| 2010/0108783 | A1 | 5/2010 | Joseph et al. | |
| 2011/0297754 | A1 * | 12/2011 | Valdez | B05B 7/0416 239/8 |

FOREIGN PATENT DOCUMENTS

| | | | | |
|---|---|---|---|---|
| DE | 03020831 | T1 | 1/2005 | |
| DE | 29825120 | U1 | 3/2005 | |
| DE | 98901823 | T1 | 3/2005 | |
| DE | 20321212 | U1 | 6/2006 | |
| DE | 69831653 | T3 | 7/2009 | |
| EP | 1435265 | A2 | 7/2004 | |
| EP | 1714705 | B1 | 4/2008 | |
| EP | 1707274 | B1 | 12/2008 | |
| EP | 1554052 | B1 | 3/2009 | |
| EP | 2078564 | A1 * | 7/2009 | B05B 7/24 |
| EP | 1435265 | B1 | 11/2009 | |
| EP | 2078564 | B1 | 4/2011 | |
| JP | H11-347462 | | 12/1999 | |
| JP | 2006-503706 | A | 2/2006 | |
| JP | 2006-312144 | | 11/2006 | |
| JP | 2013-534473 | A | 9/2013 | |
| WO | 2004037433 | A1 | 5/2004 | |

OTHER PUBLICATIONS

An International Search Report and Written Opinion corresponding to PCT/US2011/043588, dated Feb. 16, 2012.
Chinese Office Action; Application No. CN 201180033337.7; dated Feb. 4, 2015, 8 pages.
EP Communication Pursuant to Article 94(3) EPC; Application No. EP 11733769.1; dated Mar. 4, 2015; 8 pages.
CA Examination Search Report; Application No. CA 2,805,291; dated May 1, 2015; 3 pages.
CN Second Office Action; Application No. CN 20118033337.7; dated Nov. 18, 2015; 6 pages.
AU Patent Examination Report No. 1; Application No. AU2015201231; dated Apr. 27, 2016; 4 pages.
EP Second Examination Report; Application No. EP11733769.1; dated Feb. 23, 2016; 6 pages.
MX Final Office Action; Application No. MX/a/2013/000467; dated Feb. 15, 2016; 4 pages.
JP Office Action and English Translation; Application No. JP2015-046996; dated Jan. 5, 2016; 14 pages.
EP Examination Report; Application No. EP11733769.1; dated Feb. 23, 2016; 6 pages.
MX Third Office Action; Application No. MX/a/2013/000467; dated Dec. 1, 2016; 6 Pages.
Extended European Search Report for EP Application No. 17195793.9 dated Jan. 30, 2018, 10 pgs.

* cited by examiner

FIG. 3
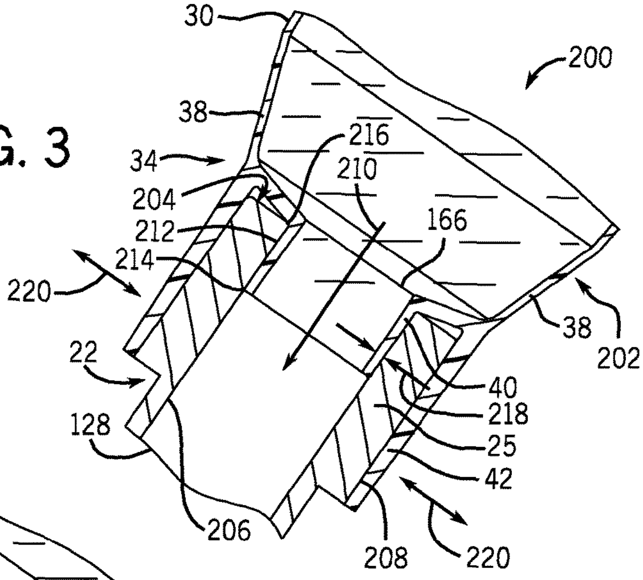
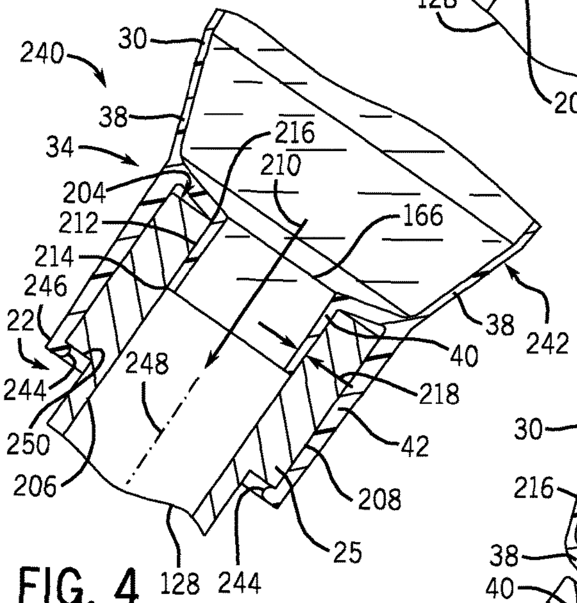
FIG. 4
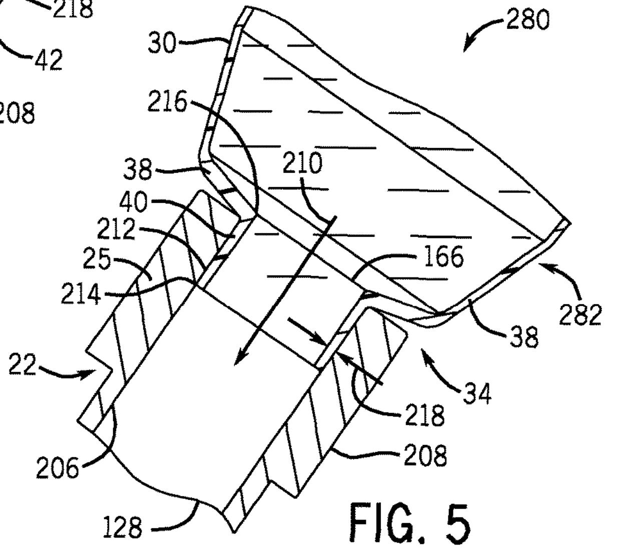
FIG. 5

LIQUID SUPPLY CONTAINER FOR A SPRAY COATING DEVICE

CROSS REFERENCE TO RELATED APPLICATION

This application claims the benefit of U.S. Provisional Patent Application No. 61/363,637, entitled "Cup Attachment", filed on Jul. 12, 2010, which is herein incorporated by reference in its entirety.

BACKGROUND

The present disclosure relates generally to gravity-feed spray coating devices, and, more specifically, to gravity-feed liquid supply containers for spray coating devices.

Spray coating devices are used to spray a liquid, such as a paint, clear coat, or other liquid coating, to the surface of a substrate. The spray coating device may receive the liquid from a liquid supply conduit or a liquid supply container coupled to the spray coating device. For example, the liquid supply container may be coupled to a top side of the spray coating device, thereby enabling a gravity feed of liquid from the container into the spray coating device. However, each type of liquid supply container may have a different connection mechanism, such as a threaded connection, a twist lock connection, or the like. As a result, if an operator desires to switch from one type of liquid supply container (e.g., a reusable container) to another type of liquid supply container (e.g., a disposable container), then the operator may be required to modify the connection on the spray coating device with an adapter. For example, the operator may be required to switch from one connection adapter to another connection adapter. Thus, a single adapter is unable to accommodate the different types of liquid supply containers.

Therefore, a need exists for a liquid supply container capable of mounting to a spray coating device regardless of the connection mechanism on the spray coating device.

SUMMARY

In a first embodiment, a system includes a gravity-feed spray coating device having a body with a liquid inlet, a handle coupled to the body, a spray head coupled to the body, a liquid passage extending from the liquid inlet to the spray head, and a gravity-feed container fastener disposed adjacent the liquid inlet. The gravity-feed container fastener includes a non-compression container fastening mechanism. The system also includes a first gravity-feed liquid supply container having a liquid outlet and a compression fitting adapter, wherein the compression fitting adapter compression fits the liquid outlet to the liquid inlet without the non-compression container fastening mechanism.

In another embodiment, a system includes a gravity-feed liquid supply container having a liquid outlet with a compression fitting adapter. The compression fitting adapter is configured to adapt a non-compression-based gravity-feed container fastener of a handheld gravity-feed spray coating device to enable a compression fit.

In another embodiment, a system includes a gravity-feed liquid supply container having a cup portion, a liquid outlet in the cup portion, and a compression fitting adapter. The compression fitting adapter includes a tubular portion disposed about the liquid outlet, wherein the tubular portion protrudes from the cup portion and is configured to compression fit inside a liquid inlet fitting of a gravity-feed spray coating device. The compression fitting adapter also includes a stabilizing sleeve portion disposed about the tubular portion, wherein the stabilizing sleeve portion protrudes from the cup portion and is configured to extend around the liquid inlet fitting to support the gravity-feed liquid supply container relative to the gravity-feed spray coating device.

These and other features, aspects, and advantages of the present disclosure will become better understood when the following detailed description is read with reference to the accompanying drawings in which like characters represent like parts throughout the drawings.

BRIEF DESCRIPTION OF THE DRAWINGS

FIG. 3 is a partial cross-sectional side view of an embodiment of the compression fitting adapter of FIG. 2, taken within line 3-3, illustrating a stabilizing sleeve concentrically disposed about a tubular portion having a compression interface;

FIG. 4 is a partial cross-sectional side view of an embodiment of the compression fitting adapter of FIG. 2, taken within line 3-3, illustrating a stabilizing sleeve having snap-fit lips concentrically disposed about a tubular portion having a compression interface; and FIG. 5 is a partial cross-sectional side view of an embodiment of the compression fitting adapter of FIG. 2, taken within line 3-3, illustrating a tubular portion having a compression interface without any additional stabilizing mechanism.

DETAILED DESCRIPTION

Figure 1:
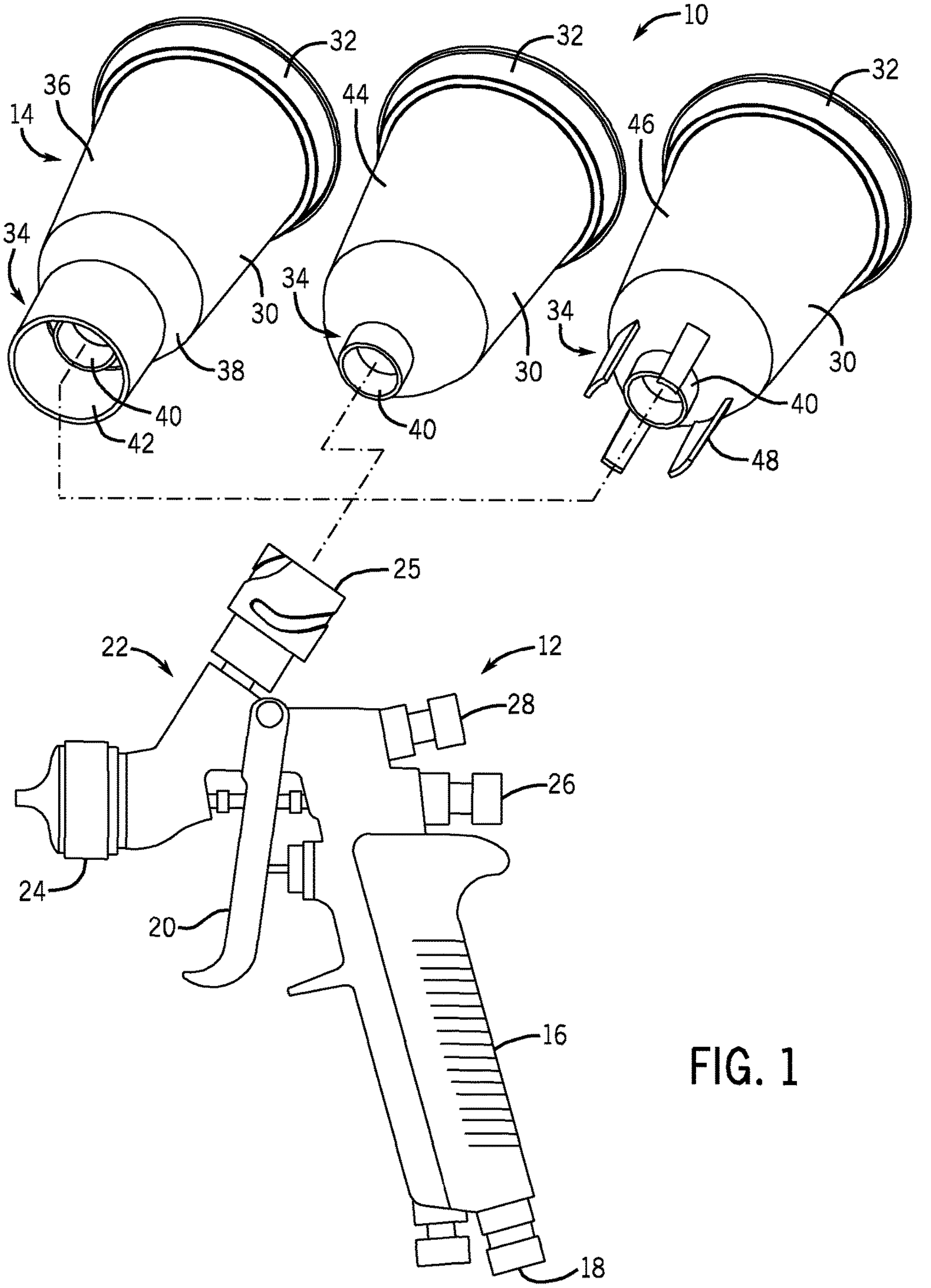
FIG. 1 is an exploded perspective view of an embodiment of a spray coating system having three different gravity-feed liquid supply containers exploded from a gravity-feed spray coating gun.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Various embodiments of the present disclosure provide a liquid supply container with a compression fitting adapter, which enables connection of the liquid supply container to a variety of spray coating devices without changing the existing connector. For example, the compression fitting adapter may simply create a compression fit, or interference fit, with the spray coating device without using the non-compression container fastening mechanism that remains in place on the spray coating device. In particular, the non-compression container fastening mechanism may include a threaded connection, a twist lock connection, or another connection, which is used to secure another liquid supply container having a mating non-compression container fastening mechanism. The disclosed embodiments of the compression fitting adapter may fit inside and/or outside of the non-compression container fastening mechanism, thereby creating a compression fit to fluidly couple the liquid supply container to the spray coating device. For example, the compression fitting adapter may include a tubular portion having a compression interface, which may be inserted into a liquid inlet of the spray coating device (e.g., inside of the non-compression container fastening mechanism). By further example, the compression fitting adapter may include a stabilizer or support, which may extend about the tubular portion (e.g., concentric with the tubular portion). Furthermore, the liquid supply container may be a gravity-feed liquid supply container, such that weight of the liquid may help maintain the compression fit between the container and the spray coating device. In this manner, the compression fitting adapter is configured to create a compression fit, or interference fit, across a plurality of different types of existing connectors without removing the existing connectors, thereby enabling a quick and easy connection of the liquid supply container. In certain embodiments, the liquid supply container may be a disposable liquid supply container, such as a disposable paper container or a disposable plastic container. Thus, an operator can quickly attach a disposable liquid supply container to a spray coating device via the compression fitting adapter, which eliminates the need to change any pre-existing connection mechanisms.

Referring now to FIG. 1, an example embodiment of a gravity-feed spray coating system 10 including a spray coating gun 12 with three different disconnected gravity-feed liquid supply containers 14 is shown. As discussed in detail below, each of the illustrated containers 14 is configured to connect with the spray coating gun via a compression fit without changing the pre-existing connector on the gun 12. Furthermore, the illustrated containers 14 may be disposable and/or recyclable containers, which may be made of paper, plastic, or another suitable material. Thus, the illustrated containers 14 may be quickly compression fit to a variety of spray coating guns 12 to reduce setup time, while also reducing cleanup time by allowing disposal and/or recycling of the container 14 after use.

The spray coating system 10 is applicable to a wide variety of applications, liquids, target objects, and types/configurations of the spray coating gun 12. For example, the spray coating gun 12 also may include a variety of different components and spray formation mechanisms to accommodate the target object and liquid coating. Depending on the application, the coating liquid may include different coating types, colors, textures, and characteristics for a variety of materials such as metal and wood. Accordingly, the illustrated containers 14 may be particularly well suited for applications involving frequent changes between the coating liquids.

The illustrated spray coating gun 12 includes a handle 16, an air inlet 18, a trigger assembly 20 configured to activate and deactivate the device, a liquid supply assembly 22, and a spray tip assembly 24 at the front of the device for delivery of the liquid to the surface of a substrate upon activation of the spray coating gun 12. The spray coating gun 12 also may include a liquid valve adjuster 26 and an air valve adjuster 28, which are rotatably adjustable to control the flow rate of the liquid coating being supplied from the liquid supply assembly 22 and the flow of air being supplied from the air inlet 18, respectively. In the illustrated embodiment, the liquid supply assembly 22 on top of the gun includes an inlet fitting 25, which has an inner liquid inlet, providing a path for the liquid coating to enter the spray coating gun 12. In the illustrated embodiment, the inlet fitting 25 is designed to attach liquid supply containers to the top of the spray coating gun 12 using some method of connection other than compression fit (e.g., spiral-shaped grooves, threads, rotational couplings, bayonet connections, snap connections, a latch, twist lock connection, etc.). In other words, the inlet fitting 25 may be defined as, or include, a non-compression container fastening mechanism. Thus, the inlet fitting 25 is not designed to create a compression fit with the containers 14.

Despite the limitations of the inlet fitting 25, the disclosed embodiments of the liquid supply containers 14 are configured to compression fit with the spray coating gun 12 by creating a compression fit with the inlet fitting 25 without using its non-compression container fastening mechanism. In other words, the illustrated containers 14 do not use any threads, twist lock connections, or other non-compression connections that are specifically designed as part of the inlet fitting 25. The containers 14, when mounted to the gun 12, may be described as a top-mounted, on-gun configuration. Furthermore, the weight of the containers 14, and any coating liquid disposed therein, may provide additional retention of the compression fit, as the weight maintains a positive force to hold the compression fit together.

The liquid supply containers 14 may have a variety of material compositions. In certain embodiments, all or some of the components of the liquid supply containers 14 may be made of a disposable and/or recyclable material, such as a transparent or translucent plastic, a fibrous or cellulosic material, a non-metallic material, or some combination thereof. For example, the liquid supply containers 14 may be made entirely or substantially (e.g., greater than 75, 80, 85, 90, 95, 99, or 100 percent) from a disposable and/or recyclable material. Embodiments of a plastic liquid supply container 14 may include a material composition consisting essentially or entirely of a polymer (e.g., polyethylene, polypropylene, etc.). Embodiments of a fibrous liquid supply container 14 may include a material composition consisting essentially or entirely of natural fibers (e.g., vegetable fibers, wood fibers, animal fibers, or mineral fibers) or synthetic/man-made fibers (e.g., cellulose, mineral, or polymer). Examples of cellulose fibers include modal or bamboo. Examples of polymer fibers include nylon, polyester, polyvinyl chloride, polyolefins, aramids, polyethylene, elastomers, and polyurethane. In certain embodiments, the liquid supply containers 14 may be designed for a single use application and may be used to store a liquid (e.g., liquid paint mixture) between uses. In other embodiments, the liquid supply containers 14 may be designed for multiple uses before being discarded. In some embodiments it may be desirable for the liquid supply containers 14 to be constructed from a translucent material; however, some embodiments may be constructed from opaque materials for use with liquid coatings that may be light sensitive.

Furthermore, the liquid supply containers 14 may have a variety of structural or functional features. Some embodiments of liquid supply containers 14 may have measurement indicia, graduated markings, or other measurement or mixing guides along the outer surface for the preparation and measuring of various liquid coatings. In certain embodiments, the liquid supply containers 14 may be collapsible, i.e., one or more walls of the liquid supply container 14 may collapse as the liquid contents are dispensed. In other embodiments, the liquid supply containers 14 may include a filtered vent, an air supply, or a pressure balancer to facilitate the gravity-feed operation. Additionally, some embodiments may be equipped with a filter, mesh, or screen to strain out solid contaminants from a liquid coating as it exits the liquid supply container 36 and enters the spray coating gun 12.

All of the depicted embodiments of liquid supply containers 14 in FIG. 1 include a cup portion 30 to contain a liquid coating material. The top of each cup portion 30 may have one or more lips 32 (e.g., annular ribs) for attachment of a lid. The bottom of each cup portion 30 includes a compression fitting adapter 34 configured to enable a compression fit, or interference fit, with the inlet fitting 25 of the liquid supply assembly 22 of the spray coating gun 12. As illustrated in FIG. 1, each embodiment of the liquid supply container 14 includes a different compression fitting adapter 34.

In one embodiment of a liquid supply container 36, the compression fitting adapter 34 extends from a tapered portion 38 at the bottom of the cup portion 30. The compression fitting adapter 34 includes a pair of concentric rings or tubular portions, e.g., an inner tubular portion 40 and an outer tubular portion 42. The inner tubular portion 40 is configured to compression fit, or interference fit, inside the inlet fitting 25 of the liquid supply assembly 22 of the spray coating device 12. Accordingly, the inner tubular portion 40 of the adapter 34 may function as a liquid delivery tube 40, which is configured to output the coating fluid from the cup portion 30 to the inlet fitting 25 of the spray coating gun 12. The outer tubular portion 42 of the adapter 34 is configured to function as a stabilizing sleeve 42. Accordingly, the outer tubular portion 42 extends around an exterior of the inlet fitting 25 to stabilize the container 36 relative to the spray coating gun 12. Thus, the inlet fitting 25 may be captured between the inner and outer tubular portions 40 and 42, thereby maintaining the compression fit during operation of the spray coating gun 12. In some embodiments, outer tubular portion 42 may have a generally circular or elliptical shape, and may be constructed from a different material (e.g., stronger and/or more rigid material) than the remainder of the liquid supply container 36. In some embodiments, the outer tubular portion 42 may have substantially thicker and/or more rigid walls than the cup portion 30 of the liquid supply container 36. In one embodiment, the outer tubular portion 42 may also have generally thicker walls at the top of the outer tubular portion 42 than the bottom (i.e. tapered walls). Once the compression fitting adapter 34 has been connected to the liquid supply assembly 22 of the spray coating device 12, the inner tubular portion 40 (e.g., liquid delivery tube) compression fits inside the inlet fitting 25 to provide a liquid flow path, while the outer tubular portion 42 (e.g., stabilizing sleeve) wraps around the outside of the inlet fitting 25 to support the liquid supply container 36 relative to the spray coating device 12.

In another embodiment of a liquid supply container 44, the compression fitting adapter 34 includes only a single tubular portion 40, e.g., a liquid delivery tube. In contrast to the container 36, the container 44 excludes the outer tubular portion 42 (e.g., stabilizer sleeve). The tubular portion 40 is configured to compression fit, or interference fit, inside the inlet fitting 25 of the liquid supply assembly 22 of the spray coating device 12. Accordingly, the tubular portion 40 of the adapter 34 may function as a liquid delivery tube 40, which is configured to output the coating fluid from the cup portion 30 to the inlet fitting 25 of the spray coating gun 12. The tubular portion 40 is also configured to support and stabilize the container 44 relative to the spray coating gun 12. In some embodiments, the tubular portion 40 may be substantially thicker and/or more rigid than the remainder of the container 44, thereby ensuring a stable compression fit interface with the spray coating gun 12. For example, the tubular portion 40 may include internal ribs or a reinforcing material.

In another embodiment of a liquid supply container 46, the compression fitting adapter 34 includes a single tubular portion 40 (e.g., a liquid delivery tube) surrounded by a plurality of stabilizing prongs 48. Again, the tubular portion 40 is configured to compression fit, or interference fit, inside the inlet fitting 25 of the liquid supply assembly 22 of the spray coating device 12. Accordingly, the tubular portion 40 of the adapter 34 may function as a liquid delivery tube 40, which is configured to output the coating fluid from the cup portion 30 to the inlet fitting 25 of the spray coating gun 12. The stabilizing prongs 48 replace the outer tubular portion 42 (e.g., stabilizing sleeve) of the container 46, and serve the same function as the tubular portion 42. Accordingly, the stabilizing prongs 48 extend around an exterior of the inlet fitting 25 to stabilize the container 46 relative to the spray coating gun 12. Thus, the inlet fitting 25 may be captured between the stabilizing prongs 48 and the tubular portion 40, thereby maintaining the compression fit during operation of the spray coating gun 12. The stabilizing prongs 48 may be equally spaced about the tubular portion 40, and may include any number, size, or shape of prongs 48. For example, the prongs 48 may include 1, 2, 3, 4, 5, 6, 7, 8, 9, 10, or more prongs 48. In the illustrated embodiment, the adapter 34 includes four equally spaced stabilization prongs 48 with a considerable gap in between the prongs 48. Other embodiments may have a smaller gap between the prongs 48. For example, the prongs 48 may be formed by creating a plurality of slits in the outer tubular portion 42 of the container 36, thereby creating tightly packed prongs 48. In some embodiments, the stabilizing prongs 48 may be constructed from a different material (e.g., stronger and/or more rigid material) than the remainder of the liquid supply container 46. Furthermore, the stabilizing prongs 48 may have substantially thicker construction than the cup portion 30 of the liquid supply container 46. Once the compression fitting adapter 34 has been connected to the liquid supply assembly 22 of the spray coating device 12, the tubular portion 40 (e.g., liquid delivery tube) compression fits inside the inlet fitting 25 to provide a liquid flow path, while the stabilizing prongs 48 extend around the outside of the inlet fitting 25 to support the liquid supply container 46 relative to the spray coating device 12.

Figure 2:
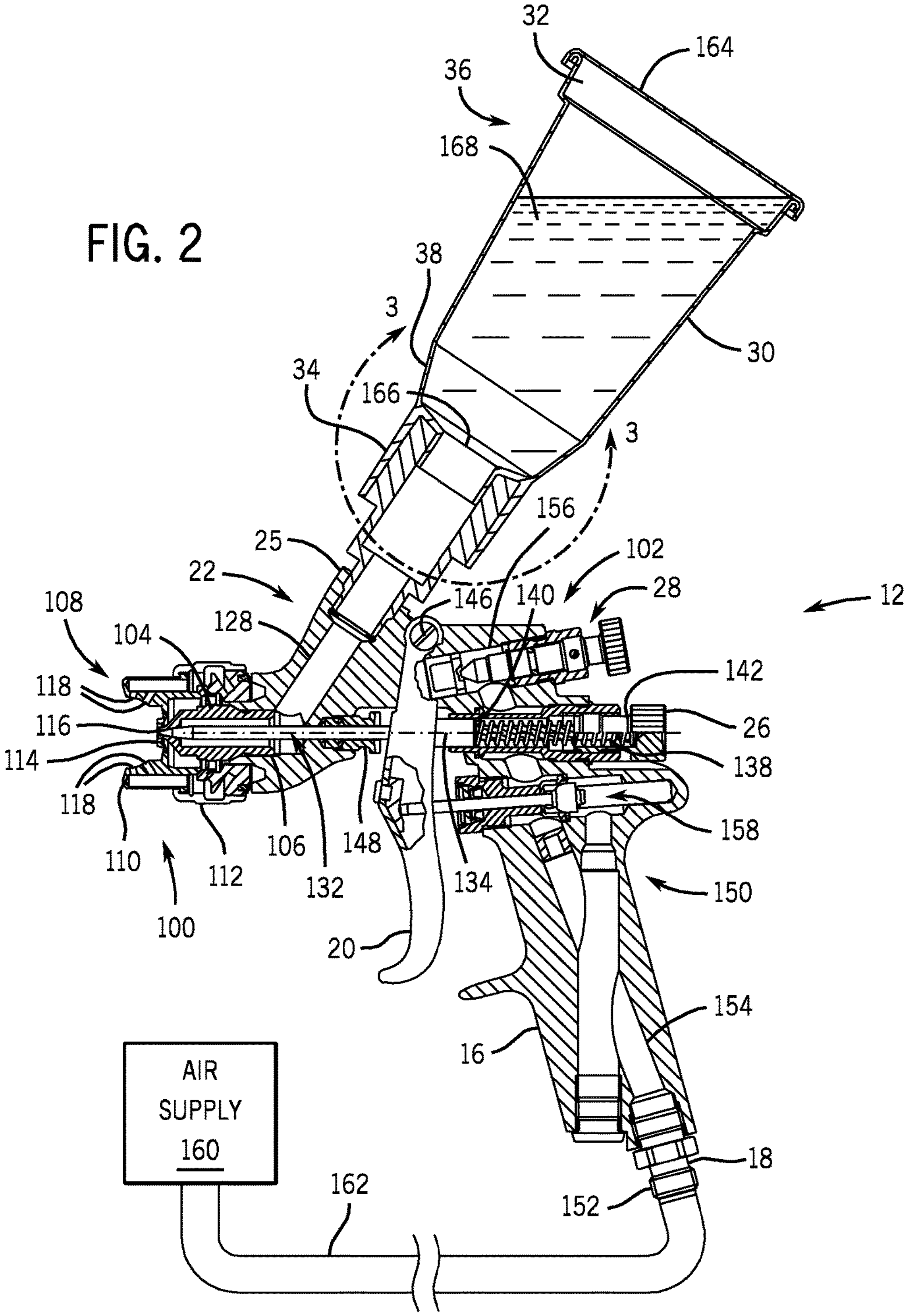
FIG. 2 is a cross-sectional side view of an embodiment of a gravity-feed spray coating gun having a non-compression container fastening mechanism, illustrating a liquid supply container attached via a compression fitting adapter without using the non-compression container fastening mechanism.

Referring now to FIG. 2, an example embodiment of the spray coating gun 12 and an attached liquid supply container 36 is shown. As illustrated, the container 36 is compression fit to the spray coating gun 12 via insertion of the inner tubular portion 40 inside the inlet fitting 25, and the container 36 is stabilized by the outer tubular portion 42 surrounding the inlet fitting 25. Embodiments of the compression fit interface are discussed in further detail below with reference to FIGS. 3 to 5.

As illustrated in FIG. 2, the spray coating gun 12 includes a spray tip assembly 100 coupled to a body 102. The spray tip assembly 100 includes a liquid delivery tip assembly 104, which may be removably inserted into a receptacle 106 of the body 102. The spray tip assembly 100 also includes a spray formation assembly 108 coupled to the liquid delivery tip assembly 104. The spray formation assembly 108 may include a variety of spray formation mechanisms, such as air, rotary, and/or electrostatic mechanisms. However, the illustrated spray formation assembly 108 comprises an air atomization cap 110, which is removably secured to the body 102 via a retaining ring 112. The air atomization cap 110 includes a variety of air atomization orifices, such as a central atomization orifice 114 disposed about a liquid tip exit 116 from the liquid delivery tip assembly 104. The air atomization cap 110 also may have one or more spray shaping orifices, such as spray shaping orifices 118, which force the spray to form a desired spray pattern (e.g., a flat spray). The spray formation assembly 108 also may comprise a variety of other atomization mechanisms to provide a desired spray pattern and droplet distribution.

The body 102 of the spray coating gun 12 includes a variety of controls and supply mechanisms for the spray tip assembly 100. As illustrated, the body 102 includes the liquid supply assembly 22 having a liquid passage 128 extending from the inlet fitting 25 to the liquid delivery tip assembly 104. The liquid supply assembly 22 also includes a liquid valve assembly 132 to control liquid flow through the liquid passage 128 and to the liquid delivery tip assembly 104. The illustrated liquid valve assembly 132 has a needle valve 134 extending movably through the body 102 between the liquid delivery tip assembly 104 and the liquid valve adjuster 26. The liquid valve adjuster 26 is rotatably adjustable against a spring 138 disposed between a rear section 140 of the needle valve 134 and an internal portion 142 of the liquid valve adjuster 26. The needle valve 134 is also coupled to the trigger 20, such that the needle valve 134 may be moved inwardly away from the liquid delivery tip assembly 104 as the trigger 20 is rotated counter clockwise about a pivot joint 146. However, any suitable inwardly or outwardly openable valve assembly may be used within the scope of the disclosed embodiments. The liquid valve assembly 132 also may include a variety of packing and seal assemblies, such as packing assembly 148, disposed between the needle valve 134 and the body 102.

An air supply assembly 150 is also disposed in the body 102 to facilitate atomization at the spray formation assembly 108. The illustrated air supply assembly 150 extends from an air inlet coupling 152 of the air inlet 18 to the air atomization cap 110 via air passages 154 and 156. The air supply assembly 150 also includes a variety of seal assemblies, air valve assemblies, and air valve adjusters to maintain and regulate the air pressure and flow through the spray coating gun 12. For example, the illustrated air supply assembly 150 includes an air valve assembly 158 coupled to the trigger 20, such that rotation of the trigger 20 about the pivot joint 146 opens the air valve assembly 158 to allow air flow from the air passage 154 to the air passage 156. The air supply assembly 150 also includes the air valve adjustor 28 to regulate the air flow to the air atomization cap 110. As illustrated, the trigger 20 is coupled to both the liquid valve assembly 132 and the air valve assembly 158, such that liquid and air simultaneously flow to the spray tip assembly 100 as the trigger 20 is pulled toward the handle 16 of the body 102. Once engaged, the spray coating gun 12 produces an atomized spray with a desired spray pattern and droplet distribution. In the illustrated embodiment of FIG. 2, the air supply 160 is coupled to the air inlet coupling 152 via air conduit 162. Embodiments of the air supply 160 may include an air compressor, a compressed air tank, a compressed inert gas tank, or a combination thereof.

The illustrated gravity-feed liquid supply container 36 has a generally cylindrical or conical shape. However, the liquid supply container 36 may have any suitable shape depending on the particular application. The liquid supply container 36 includes one or more lips 32 (e.g., annular ribs) to facilitate attachment of a sealing cover or lid 164 that covers the cup portion 30 of the container 36. For example, the lid 164 may snap fit onto the cup portion 30 via the lips 32. In one embodiment, the sealing lid 164 is constructed of similar materials as the remainder of the liquid supply container 36, and may be disposable and/or recyclable after a single use or a limited number of uses. The cup portion 30 extends to a liquid outlet 166 and the compression fitting adapter 34. As discussed above with reference to FIG. 1, the compression fitting adapter 34 of the container 36 includes inner and outer tubular portions 40 and 42, wherein the inner tubular portion 40 functions as a liquid delivery tube and the outer tubular portion functions as a stabilizing sleeve. Accordingly, the inner tubular portion 40 extends into the inlet fitting 25, and forms an interference fit or compression fit with the inlet fitting 25. The outer tubular portion 42 extends around an exterior of the inlet fitting 25, and provides support and stability to maintain the compression fit between the inlet fitting 25 and the inner tubular portion 40. For example, the outer tubular portion 42 may substantially reduce or prevent lateral movement, rotation, or pivoting of the container 36 relative to the inlet fitting 25. Upon making this compression fit interface, the inner tubular portion 40 (e.g., liquid delivery tube 40) of the compression fitting adapter 34 provides a flow path for a coating liquid 168 disposed within the liquid supply container 36 to flow through the inlet fitting 25 into the liquid passage 128 of the liquid supply assembly 22. In certain embodiments, the liquid outlet 166 and/or the inner tubular portion 40 may include a filter, mesh, or screen to strain out solid contaminants from the coating liquid 168 as it flows from the container 36 to the spray coating gun 12.

Referring now to FIG. 3, an example embodiment of a system 200 having a liquid supply container 202 coupled to the liquid supply assembly 22 of the spray coating gun 12 is shown. In the illustrated embodiment, the liquid supply container 202 has the cup portion 30 extending to the tapered portion 38, which then extends to the compression fitting adapter 34 and the liquid outlet 166. Similar to the container 36 of FIG. 1, the compression fitting adapter 34 includes the inner and outer tubular portions 40 and 42, which protrude away from a bottom of the container 202 in a coaxial or concentric arrangement. As illustrated, the outer tubular portion 42 surrounds or encircles the inner tubular portion 40 at an offset distance to define an intermediate annular space 204. The inlet fitting 25 fits within the intermediate annular space 204 to achieve a stabilized compression fit interface between the inlet fitting 25 and the adapter 34.

The inlet fitting 25 of the liquid supply assembly 22 includes an internal portion 206 (e.g., internal surface or liquid passage) and an outer portion 208 (e.g., exterior surface). The inner portion 206 of the inlet fitting 25 leads into the liquid passage 128 of the spray coating gun 12, thereby providing a flow path 210 for the coating liquid to pass from the liquid supply container 202 to the spray coating gun 12. The outer portion 208 of the inlet fitting 25 has a non-compression container fastening mechanism, such as threads, locking slots or grooves, or other non-compression type fasteners, which specifically connect with mating non-compression container fastening mechanism on certain containers (not shown). For example, the outer portion 208 may include male threads designed to interface with female threads on another container (not shown), such that the connection is a threaded connection. By further example, the outer portion 208 may include a twist lock feature (e.g., an arcuate slot) designed to interface with a mating twist lock feature (e.g., a pair of pins) on another container (not shown), such that the connection is a twist lock connection. In either case, the outer portion 208 is not designed to rely on a compression fit, or interference fit, to connect the inlet fitting 25 to a container.

Nevertheless, the illustrated compression fitting adapter 34 enables a compression fit interface, or interference fit interface, between the inlet fitting 25 and the container 202. For example, the inner tubular portion 40 (e.g., liquid delivery tube) includes a compression interface 212 configured to fit within the inner portion 206 of the inlet fitting 25. In certain embodiments, the compression interface 212 may be a cylindrical, conical, or generally tapered surface. For example, the compression interface 212 may decrease in diameter from a tip 214 to a base 216 of the inner tubular portion 40. Some embodiments of the compression interface 212 may have a taper angle of approximately 1 to 10 degrees, 1 to 5 degrees, or 1 to 2 degrees between the tip 214 and the base 216. In this manner, the compression interface 212 may gradually increase pressure (or the compression fit) between the inner tubular portion 40 and the inner portion 206 of the inlet fitting 25. Furthermore, a wall thickness 218 of the inner tubular portion 40 may gradually increase from the tip 214 to the base 216. As a result, the inner tubular portion 40 may be more resilient or able to compress near the tip 214, while the inner tubular portion 40 is gradually more rigid and less able to compress near the base 216. In this manner, the wall thickness 218 may further improve the application of pressure (or the compression fit) between the inner tubular portion 40 and the inner portion 206 of the inlet fitting 25.

The outer tubular portion 42 (e.g., stabilizing sleeve) of the compression fitting adapter 34 encircles the outer portion 208 of the inlet fitting 25 to support and stabilize the liquid supply container 202 relative to the spray coating gun 12. For example, the outer tubular portion 42 may extend around, without specifically using, the non-compression container fastening mechanism of the outer portion 208 of the inlet fitting 25. For example, the outer tubular portion 42 may exclude threads if the outer portion 208 includes threads. By further example, the outer tubular portion 42 may exclude a mating twist lock feature if the outer portion 208 includes twist lock feature. Instead, the outer tubular portion 42 may simply capture the outer portion 208 of the inlet fitting 25, thereby blocking lateral movement as indicated by arrows 220. In this manner, the inner and outer tubular portions 40 and 42 essentially capture the inlet fitting 25, thereby improving the stability of the compression fit interface.

Referring now to FIG. 4, an example embodiment of a system 240 having a liquid supply container 242 coupled to the liquid supply assembly 22 of the spray coating gun 12 is shown. In the illustrated embodiment, the liquid supply container 202 has the cup portion 30 extending to the tapered portion 38, which then extends to the compression fitting adapter 34 and the liquid outlet 166. Similar to the container 202 of FIG. 3, the compression fitting adapter 34 includes the inner and outer tubular portions 40 and 42, which protrude away from a bottom of the container 242 in a coaxial or concentric arrangement. As illustrated, the outer tubular portion 42 surrounds or encircles the inner tubular portion 40 at an offset distance to define an intermediate annular space 204. The inlet fitting 25 fits within the intermediate annular space 204 to achieve a stabilized compression fit interface between the inlet fitting 25 and the adapter 34. Furthermore, in the illustrated embodiment, the outer tubular portion 42 includes a locking feature or positive stop 244, such as a lip, rib, or prong.

The illustrated locking feature 244 is configured to snap into place as the outer tubular portion 42 of the adapter 34 slides over the exterior of the inlet fitting 25. In certain embodiments, the locking feature 244 may be disposed at a tip portion 246 of the outer tubular portion 42 (e.g., stabilizing sleeve), and may extend radially inward toward an axis 248 of the adapter 34. The locking feature 244 may be a single annular rib disposed about the interior of the outer tubular portion 42, or the locking feature 244 may include one or more discrete lips or protrusions disposed about the interior of the outer tubular portion 42. Furthermore, the locking feature 244 may have a curved shape (e.g., a U-shaped cross-section), a tapered shape (e.g., a V-shaped cross-section), or a rectangular shape. During connection of the adapter 34 with the inlet fitting 25, the outer tubular portion 42 may resiliently expand about the outer portion 208 of the inlet fitting 25, thereby allowing the locking feature 244 to slide along the outer portion 208. Upon reaching a ledge or abutment surface 250 of the inlet fitting 25, the locking feature 244 may snap into place (i.e., move radially inward toward the axis 248) by virtue of the resiliency of the outer tubular portion 42. Thus, the locking feature 248 may block removal of the adapter 34 from the fitting 25, thereby helping to maintain the compression fit between the inner tubular portion 40 and the inner portion 206.

Referring now to FIG. 5, an example embodiment of a system 280 having a liquid supply container 282 coupled to the liquid supply assembly 22 of the spray coating gun 12 is shown. In the illustrated embodiment, the liquid supply container 282 has the cup portion 30 extending to the tapered portion 38, which then extends to the compression fitting adapter 34 and the liquid outlet 166. Similar to the containers of FIGS. 1-4, the compression fitting adapter 34 includes the tubular portion 40, which protrudes away from a bottom of the container 282 from the base 216 to the tip 214. However, the illustrated compression fitting adapter 34 excludes the outer tubular portion 42 (e.g., stabilizing sleeve), and relies solely on the tubular portion 40 to create the compression fit with the inlet fitting 25.

As illustrated in FIGS. 1 to 5 and described in detail above, the disclosed embodiments enable use of a disposable and/or recyclable container with a variety of different spray coating guns in a simple and timely manner. In particular, the disclosed embodiments employ a compression fitting, which is able to connect to non-compression container fastening mechanism. As a result, an operator is not required to change the fastening mechanisms, but rather is able to leave the non-compression container fastening mechanism in place while creating a temporary compression fit. After use of the container having the compression fitting adapter, the container may be disposed of without any cleaning, and then the operator may revert back to another type of container that specifically interfaces with the non-compression container fastening mechanism.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:

a gravity-feed spray coating device, comprising:

a body comprising a liquid inlet in an inlet portion having a first compression interface with a first smooth tapered annular surface;

a handle coupled to the body;

a spray head coupled to the body; and a liquid passage extending from the liquid inlet to the spray head; and a first gravity-feed liquid supply container, comprising:

a liquid outlet in a tubular portion;

a second compression interface with a second smooth tapered annular surface disposed along the tubular portion;

a lateral support integrally formed with the first gravity feed liquid supply container and positioned circumferentially relative to the tubular portion, wherein the tubular portion protrudes outwardly from the first gravity-feed liquid supply container in a connection direction along an axis to a first distal end, and the lateral support protrudes outwardly from the first gravity-feed liquid supply container in the connection direction along the axis to a second distal end beyond the first distal end of the tubular portion; and an intermediate space between the tubular portion and the lateral support, wherein the lateral support protrudes outwardly from the first gravity-feed liquid supply container in the connection direction along the axis of the tubular portion;

wherein the inlet portion of the gravity-feed spray coating device fits within the intermediate space of the first gravity-feed liquid supply container, wherein the first and second compression interfaces compression fit together along the first and second smooth tapered annular surfaces in the connection direction without any non-compression connections, wherein the lateral support contacts the inlet portion lengthwise along the lateral support in the connection direction without any non-compression connections.

2. The system of claim 1, comprising a second gravity-feed liquid supply container, wherein the first and second gravity-feed liquid supply containers are configured to mutually exclusively couple to the inlet portion of the gravity-feed spray coating device, and the second gravity-feed liquid supply container is configured to couple with the inlet portion via a non-compression interface.

3. The system of claim 1, wherein the first compression interface has the first smooth tapered annular surface disposed along an interior bore of the inlet portion, and the second compression interface has the second smooth tapered annular surface disposed along an exterior of the tubular portion.

4. The system of claim 1, wherein the first and second tapered annular surfaces comprise respective first and second conical surfaces that compression fit together.

5. The system of claim 1, wherein the lateral support is configured to stabilize the first gravity-feed liquid supply container relative to the gravity-feed spray coating device while the inlet portion is coupled to the tubular portion via the first and second compression interfaces.

6. The system of claim 5, wherein the lateral support comprises a stabilizing sleeve disposed circumferentially about the tubular portion.

7. The system of claim 5, wherein the lateral support comprises a plurality of stabilizing prongs disposed circumferentially about the tubular portion.

8. The system of claim 6, wherein the stabilizing sleeve and the tubular portion capture the inlet portion in the intermediate space, and the inlet portion contacts the stabilizing sleeve along an annular interface.

9. The system of claim 1, wherein the inlet portion, the tubular portion, and the lateral support are concentric annular structures.

10. The system of claim 1, wherein the first gravity-feed liquid supply container is a disposable container having a limited number of uses, and the disposable container consists essentially of plastic.

11. The system of claim 1, wherein the first gravity-feed liquid supply container is a disposable container having a limited number of uses, and the disposable container consists essentially of paper.

12. A system, comprising:

a gravity-feed liquid supply container, comprising:

a liquid outlet in a tubular portion;

a first compression interface with a first smooth tapered annular surface disposed along the tubular portion, wherein the tubular portion protrudes outwardly from the gravity-feed liquid supply container in a connection direction along an axis to a first distal end; and a stabilizing sleeve positioned circumferentially about the tubular portion and integrally formed with the gravity-feed liquid supply container, wherein the stabilizing sleeve protrudes outwardly from the gravity-feed liquid supply container in the connection direction along the axis to a second distal end beyond the first distal end of the tubular portion; and an intermediate space between the tubular portion and the stabilizing sleeve, wherein the stabilizing sleeve protrudes outwardly from the gravity-feed liquid supply container in the connection direction along the axis of the tubular portion, wherein the intermediate space is configured to receive an inlet portion of a gravity-feed spray coating device between the tubular portion and the stabilizing sleeve, wherein the stabilizing sleeve is configured to contact the inlet portion lengthwise along the stabilizing sleeve in the connection direction, wherein the first compression interface is configured to compression fit the tubular portion with the inlet portion of the gravity-feed spray coating device along a second compression interface having a second smooth tapered annular surface in the connection direction.

13. The system of claim 12, wherein the first compression interface has the first smooth tapered annular surface disposed along an exterior of the tubular portion, and the second compression interface has the second smooth tapered annular surface disposed along an interior bore of the inlet portion.

14. The system of claim 12, wherein a length of the stabilizing sleeve is at least double a corresponding length of the tubular portion.

15. The system of claim 12, wherein the stabilizing sleeve has an annular interior surface that extends along the axis directly to a distal end of the stabilizing sleeve.

16. The system of claim 12, wherein the stabilizing sleeve and the tubular portion are configured to capture the inlet portion in the intermediate space, and the stabilizing sleeve is configured to contact the inlet portion along an annular interface.

17. A system, comprising:

a gravity-feed liquid supply container, comprising:

a body portion;

a liquid outlet in the body portion; and a compression fitting adapter integrally formed with the body portion, comprising:

a tubular portion disposed about the liquid outlet, wherein the tubular portion comprises a first compression interface having a first smooth annular surface, the tubular portion protrudes a distance from the body portion to a first distal end, and the tubular portion is configured to compression fit with an inlet portion of a gravity-feed spray coating device along a second compression interface having a second smooth annular surface in a connection direction; and a lateral support fixedly positioned relative to the tubular portion, wherein the lateral support protrudes in the connection direction outwardly from the body portion lengthwise along the tubular portion at least to the first distal end of the tubular portion, wherein the lateral support is configured to contact the inlet portion lengthwise along the lateral support in the connection direction, wherein the tubular portion and the lateral support are configured to couple with the inlet portion in an axial direction without rotation.

18. The system of claim 17, wherein the first compression interface has the first smooth annular surface disposed along an exterior of the tubular portion, and the second compression interface has the second smooth annular surface disposed along an interior bore of the inlet portion.

19. The system of claim 17, wherein the lateral support protrudes in the connection direction outwardly from the body portion lengthwise along the tubular portion to a second distal end beyond the first distal end of the tubular portion.

20. The system of claim 17, wherein the lateral support comprises a stabilizing sleeve disposed in a concentric arrangement relative to the tubular portion.

21. The system of claim 17, wherein the first and second smooth annular surfaces comprise respective first and second smooth tapered annular surfaces that are configured to compression fit with one another.

22. The system of claim 1, wherein the inlet portion has a non-compression container mounting interface that is not used while coupling the first gravity-feed liquid supply container to the gravity-feed spray coating device, and the lateral support extends over the non-compression container mounting interface.

23. The system of claim 22, wherein the non-compression container mounting interface comprises a twist lock connection.

24. The system of claim 22, wherein the non-compression container mounting interface comprises a threaded connection.

25. The system of claim 22, wherein the lateral support comprises a stabilizing sleeve disposed circumferentially about the tubular portion, and the stabilizing sleeve extends over the non-compression container mounting interface.

26. The system of claim 25, wherein the non-compression container mounting interface comprises a spiral groove.

27. The system of claim 12, wherein the tubular portion and the stabilizing sleeve are configured to couple with the inlet portion without any non-compression connections.

28. The system of claim 17, wherein the tubular portion and the lateral support are configured to couple with the inlet portion without any non-compression connections.

29. A system comprising:

a first gravity-feed spray coating device, comprising:

a body comprising a liquid inlet in an inlet portion having a first compression interface with a first smooth tapered annular surface;

a handle coupled to the body;

a spray head coupled to the body; and a liquid passage extending from the liquid inlet to the spray head; and a first gravity-feed liquid supply container, comprising:

a liquid outlet in a tubular portion;

a second compression interface with a second smooth tapered annular surface disposed along the tubular portion;

a lateral support integrally formed with the first gravity feed liquid supply container and positioned circumferentially relative to the tubular portion;

an intermediate space between the tubular portion and the lateral support, wherein the lateral support protrudes outwardly from the first gravity-feed liquid supply container in a connection direction along an axis of the tubular portion;

wherein the inlet portion of the gravity-feed spray coating device fits within the intermediate space of the first gravity-feed liquid supply container, wherein the first and second compression interfaces compression fit together along the first and second smooth tapered annular surfaces in the connection direction without any non-compression connections, wherein the lateral support contacts the inlet portion lengthwise along the lateral support in the connection direction without any non-compression connections; and a second gravity-feed liquid supply container, wherein the first and second gravity-feed liquid supply containers are configured to mutually exclusively couple to the inlet portion of the gravity-feed spray coating device, and the second gravity-feed liquid supply container is configured to couple with the inlet portion via a non-compression interface.

30. A system comprising:

a first gravity-feed spray coating device, comprising:

a body comprising a liquid inlet in an inlet portion having a first compression interface with a first smooth tapered annular surface, wherein the inlet portion has a non-compression container mounting interface that is not used while coupling the first gravity-feed liquid supply container to the gravity-feed spray coating device;

a handle coupled to the body;

a spray head coupled to the body; and a liquid passage extending from the liquid inlet to the spray head; and a first gravity-feed liquid supply container, comprising:

a liquid outlet in a tubular portion;

a second compression interface with a second smooth tapered annular surface disposed along the tubular portion;

a lateral support integrally formed with the first gravity feed liquid supply container and positioned circumferentially relative to the tubular portion, wherein the lateral support extends over the non-compression container mounting interface; and an intermediate space between the tubular portion and the lateral support, wherein the lateral support protrudes outwardly from the first gravity-feed liquid supply container in a connection direction along an axis of the tubular portion;

wherein the inlet portion of the gravity-feed spray coating device fits within the intermediate space of the first gravity-feed liquid supply container, wherein the first and second compression interfaces compression fit together along the first and second smooth tapered annular surfaces in the connection direction without any non-compression connections, wherein the lateral support contacts the inlet portion lengthwise along the lateral support in the connection direction without any non-compression connections.

31. The system of claim 30, wherein the non-compression container mounting interface comprises a twist lock connection.

32. The system of claim 30, wherein the non-compression container mounting interface comprises a threaded connection.

33. The system of claim 30, wherein the lateral support comprises a stabilizing sleeve disposed circumferentially about the tubular portion, and the stabilizing sleeve extends over the non-compression container mounting interface.

34. The system of claim 33, wherein the non-compression container mounting interface comprises a spiral groove.

* * * * *